Jan. 19, 1965 H. E. WALKER 3,165,778
FISH CONVEYOR AND CUTTER
Original Filed Aug. 13, 1959 2 Sheets-Sheet 1

INVENTOR.
HARRY E. WALKER
BY Morse & Altman
ATTORNEYS

Jan. 19, 1965 H. E. WALKER 3,165,778
FISH CONVEYOR AND CUTTER
Original Filed Aug. 13, 1959 2 Sheets-Sheet 2

INVENTOR.
HARRY E. WALKER
BY Morse & Altman
ATTORNEYS

United States Patent Office 3,165,778
Patented Jan. 19, 1965

3,165,778
FISH CONVEYOR AND CUTTER
Harry E. Walker, Rte. 2, Mechanic Falls, Maine
Original application Aug. 13, 1959, Ser. No. 833,482, now Patent No. 3,104,756, dated Sept. 24, 1963. Divided and this application Sept. 20, 1962, Ser. No. 224,956
3 Claims. (Cl. 17—4)

This application is a division of my copending application Serial No. 833,482, filed August 13, 1959, for Mechanism for Cutting Fish, pursuant to which application Patent No. 3,104,756 was issued September 24, 1963. The invention relates to an endless conveyor having a series of troughs arranged to receive small fish one at a time, and improved apparatus for correctly positioning the fish in the troughs so that when they are carried thereby to rotating disk knives, the fish will be properly cut with a minimum of waste. This is not easy to achieve in a machine which is operated at a speed high enough to make its use commercially profitable.

For a more complete understanding of the invention, reference may be had to the following description thereof and to the drawings, of which FIGURE 1 is a rear elevational view of mechanism embodying the invention;

Figure 1:
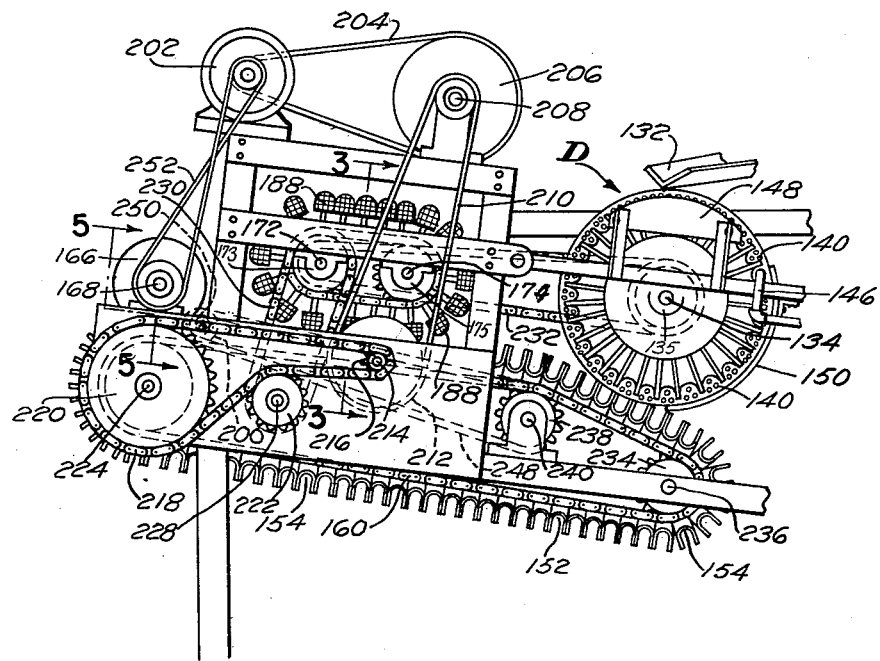
Figure 2:
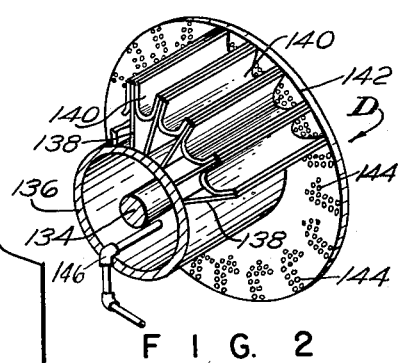
FIGURE 2 is a perspective view of the distributing wheel shown in FIGURE 1, a portion being broken away.

Beneath the lower end of a chute 132 a distributor wheel D revolves on a horizontal shaft 134 journalled in suitable bearings 135 on the main frame of the machine. The wheel itself comprises a hub 136 (FIGURE 2) from which radiate a number of evenly spaced radial fins 138 carrying between their outer edges a series of troughs 140. These troughs are approximately semi-cylindrical and extend parallel to the axis of the shaft 134. The front ends of the troughs 140 are closed by a plate 142 which is a part of the wheel D and is perforated as at 144 at the end of each trough to permit the escape of water which is introduced in a stream from a nozzle 146. The lower end of the chute 132 is located above the uppermost trough 140 in the wheel near the front end thereof so that a fish leaving the chute 132 falls into the trough which is then uppermost, its rearward progress being stopped by a fixed stop plate 148 mounted to span the rear ends of a few of the uppermost troughs in the wheel. The wheel as seen in FIGURE 1 is rotated clockwise so that fish deposited in the troughs from the chute 132 are carried around past the nozzle 146 to the bottom of the wheel. The stream from the nozzle 146 washes each fish toward the forward end of the trough until its tail engages the plate 142 which thus acts as a gauge to position the fish properly in its trough. To prevent the fish from falling out of the troughs prematurely a curved shield 150 is mounted opposite a lower quadrant of the wheel as indicated in FIGURE 1, this shield extending down almost to the lowermost point of the wheel at which point the fishes in the troughs are successively delivered to a conveyor 152 which carries them to the cutting mechanism.

The conveyor 152 is an endless series of open-ended troughs 154 which are similar in size and shape to the troughs 140. The wheel D and the conveyor 152 are driven synchronously so that, as indicated in FIGURE 1, each trough 140 as it moves beyond the lower end of the shield 150 has a trough 154 directly below it to receive a fish therefrom.

Figure 4:
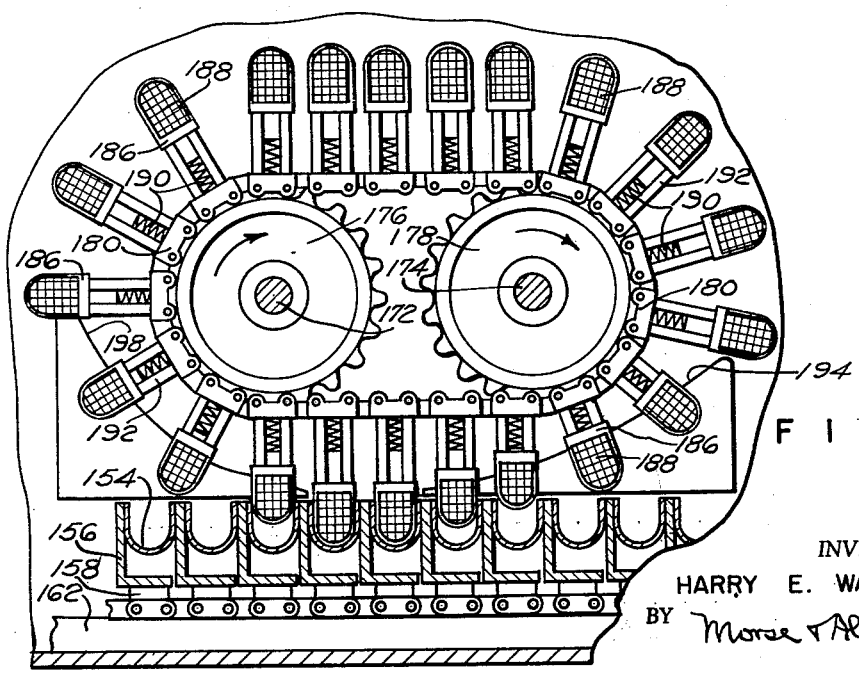
FIGURE 4 is a section on the line 4—4 of FIGURE 3.
Figure 3:
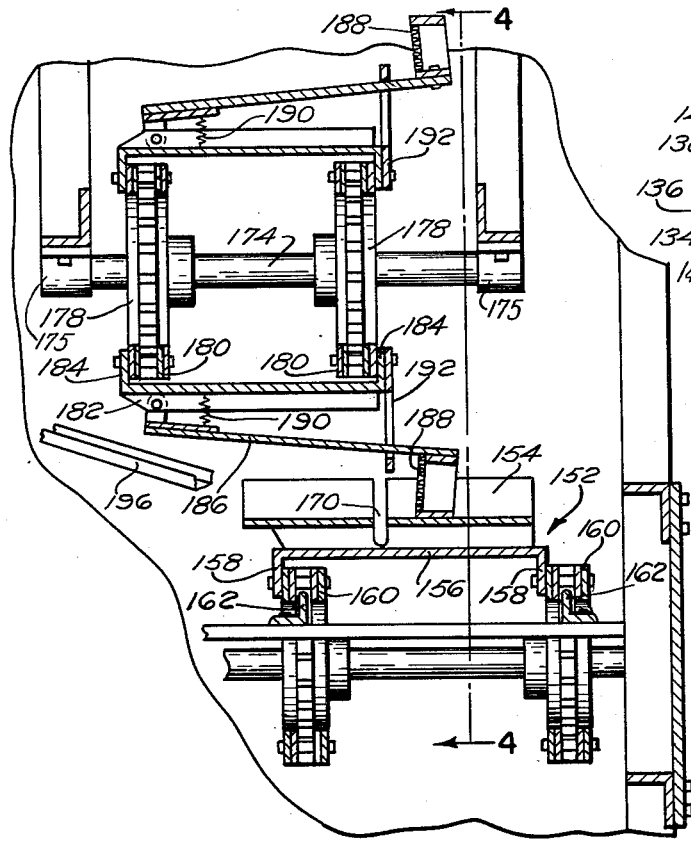
FIGURE 3 is a section on the line 3—3 of FIGURE 1, and on a larger scale.
Figure 5:
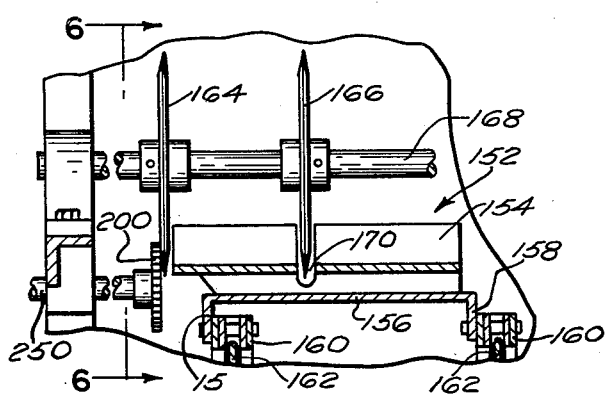
FIGURE 5 is a section on the line 5—5 of FIGURE 1 and on a larger scale.
Figure 6:
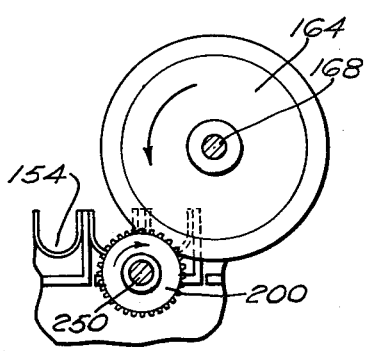
FIGURE 6 is a section on the line 6—6 of FIGURE 5.

The wheel D is slightly offset forward with respect to the conveyor 152 so that fish which fall from the troughs 140 where the tails are against the gauge disk 142 into the troughs 154 of the conveyor will be located therein with their tails projecting a uniform distance out from the front end of the conveyor troughs. Each trough 154 is secured along one side edge to a bracket 156 which is mounted by means of ears 158 to two parallel endless chains 160 which are a part of the conveyor 152. As shown in FIGURE 4, when the chains run in a straight stretch, the successive troughs are contiguous. Rails 162 are mounted on the main frame for the portion of the conveyor approaching the fish-cutting knives 164 and 166 to run on. The knives are disk blades mounted on a common shaft 168. The knife 164 is tangent, or nearly so, to the front ends of the passing troughs 154. The knife 166 enters a slot 170 in each trough and its supporting bracket as they pass the knives, the slots 170 extending down below the bottom of the troughs 154 as indicated in FIGURES 3 and 5. For preparing fish to be packed in 4-inch cans, the knife 166 is spaced four inches from the knife 164.

A clamping mechanism which also acts as a gauge for the very small fish is mounted on the main frame over the stretch of the conveyor 152 which runs on the rails 162, but is offset forward with respect thereto as shown in FIGURE 3. Two parallel shafts 172 and 174 are journalled in suitable bearings 173, 175, respectively above the conveyor 152. Mounted on the shaft 172 are a pair of sprocket wheels 176, and on the shaft 174 are similar sprocket wheels 178 coplanar with the respective wheels 176. Endless chains 180 extend over the wheels 176 and 178, these chains being preferably similar in structure to the chains 160. Mounted on the chains 180 and spanning the space between them are a series of presser units the center lines of which have the same spacing as the center lines of the troughs 154. Each presser unit comprises a bracket 182 secured by ears 184 at its ends to links of the respective chains 180. Pivoted to each bracket 182 near its forward end is a lever arm 186 which extends rearward from the pivot to a point beyond the rear end of the bracket. At the rear end of each arm 186 is a foraminous clamping element 188 which is shaped to fit loosely in a trough 154 in a plane transverse to the axis of the trough. A compression spring 190 is provided for each arm 186 to press it outward from its bracket 182, that is, upward when the presser unit is in the upper stretch of the clamping mechanism and downward when the presser unit is in the lower stretch of the clamping mechanism. The outward movement of each arm 186 is limited by a rigid loop member 192 which is mounted at the rear end of its bracket 182. When the machine is operating, the presser units move in step with the troughs 154. A cam 194 (FIGURE 4) rocks the arms 186 inward as the units approach the troughs 154 and then gradually releases the arms to permit the clamping elements 188 to enter successive troughs 154. The length of the arms 186 is such that when a clamping element 188 enters a trough 154 it is spaced about five inches from the front end of the trough, that is, about an inch to the rear of the slot 170. If a fish of greater length than five inches from the tip of the head to the base of the tail is in the trough, the clamping element 188 will be pressed on it by the spring 190 so that the fish will be clamped thereby until it has passed a spout 196 which sends a stream of water into the forward end of each passing trough 154, the delivery end of the spout preferably having a width approximately equal to the width of two troughs. If the fish in the trough is less than five inches in length from the tip of the head to the base of the tail, the clamping element will bear on the bottom of the trough and will then act as a gauging element in conjunction with said stream of water which has a moderate velocity but sufficient volume to wash a small fish in the trough 154 toward the rear until its nose hits the clamping element 188 which thus locates the small fish properly for cutting. If the fish is longer than five inches, the clamping element 188 will hold it fast so that it will not be washed toward the rear in the trough by the stream. By means of these clamping elements which act as gauges for the small fish, the machine can handle, without adjustment, fish of any size which can be packed in four-inch cans as "sardines". After the troughs have passed the spout 196, the clamping elements 188 are lifted from the troughs by an edge cam 198 on which the arm 186 ride as the presser units swing up about the sprocket wheels 176. The fish in the troughs 154 are then carried to the knives 164 and 166.

If a fish is large enough to have been clamped by a clamping element 188, the knife 164 cuts off the tail which projects out from the front end of the trough, while the knife 166 cuts the body at a point four inches from the first cut, this four-inch portion being the choicest part of the fish. If the fish is less than five inches in length, the knife 164 will not cut the tail at all, but the knife 166 will cut the fish about one inch from the head end, thus removing the head but leaving practically all of the body for packing.

As the tails which project from the forward end of the troughs are usually somewhat limp, a supporting star wheel 200 is mounted adjacent to the edge of the knife 164 and the front end of the passing troughs. This wheel is small (e.g., 3" diameter) and has ⅛" teeth which carry the fish tails to the knife 164 as the wheel is rotated.

Driving connections for the distributing wheel and cutting mechanism are shown in FIGURE 1. A motor 202 is connected by a belt 204 to a pulley wheel 206 on a shaft 208 which is connected by a belt 210 to a pulley wheel 212 on a shaft 214. This shaft also carries a sprocket wheel 216 which drives a chain 218 meshing with sprocket wheels 220 and 222. The sprocket wheel 220 is on a shaft 224 on which also are sprocket wheels (not shown) which drive the conveyor chains 160. The wheel 222 is on a shaft 228 which is connected by sprocket wheels and chains 230 to the shaft 172 which drives the clamping mechanism shown in FIGURE 4. The shaft 172 is connected by sprocket wheels and chain 232 to the shaft 134 on which the distributor wheel D is mounted. The conveyor chains 160 mesh with idler wheels 234 on a shaft 236 and idler wheels 238 on a shaft 240. The shaft 240 is connected by sprocket wheels and chain 248 to a shaft 250 on which the star wheel 200 is mounted.

The knives 164 and 166 are rotated at high speed by a belt connection 252 between the motor 202 and the shaft 168 on which the knives are mounted.

I claim:

1. In an apparatus for cutting fish, a frame, a horizontal shaft rotatably mounted on said frame, a wheel on said shaft having a circular series of semi-cylindrical troughs opening outward at its periphery and arranged parallel to said shaft, a perforated screen at one end of each said trough, means for rotating said wheel, means above the wheel for depositing fish in the troughs, as the wheel rotates, a jet nozzle mounted beside said wheel and directed along the long axis of the passing troughs towards the screen at the end thereof, an endless conveyor carried by said frame, said conveyor having a series of semi-cylindrical troughs arranged side by side transversely to the direction of motion thereof, means for driving said conveyor in synchronism with said wheel, said conveyor being mounted below said wheel and in transverse alignment therewith so that at least one of its troughs registers with at least one of the lowermost troughs of the wheel whereby to transfer fish from the wheel to the conveyor by gravity, said wheel having means associated therewith for retaining fish in each wheel trough until it registers with a conveyor trough, and means for cutting fish carried by the conveyor.

2. In an apparatus for cutting fish, a frame, an endless conveyor mounted on said frame, means for driving said conveyor, said conveyor including a series of semi-cylindrical troughs arranged side by side transversely to the direction of motion, each trough having a tranverse slot at the same distance from the front end thereof, means for depositing fish at a loading point in successive troughs with the tail of each fish projecting from the front end of the trough, a disk knife tangent to the front end of said troughs at a cutting point spaced from said loading point, a second disk knife parallel to the first said knife operating in said slots of the troughs passing said cutting point, a rotatable shaft on which both said knives are mounted, a series of foraminous presser elements carried above said conveyor, means operating to insert successive presser elements in successive troughs which have passed the loading point and to remove said presser elements before the corresponding troughs reach the cutting point, said operating means comprising two endless chains in parallel planes, transverse bars connected at their ends to the respective chains, said bars having the same spacing as the center lines of the troughs of said conveyor, an arm pivoted to each said bar at a point forward of said conveyor and extending rearward a predetermined distance beyond the slots in the troughs, each said arm having one of said presser elements at the rear end thereof, and means for supplying a stream of water into the forward end of the troughs occupied by a presser element.

3. In an apparatus for cutting fish, a frame, a shaft rotatably mounted on said frame, two circular knives mounted on said shaft four inches apart, means for rotating said shaft and knives, an endless conveyor for fish mounted on said frame, said conveyor having an upper reach extending from a loading point to said knives, said conveyor including a series of troughs arranged transversely to the direction of movement thereof with a slot in each trough four inches from the front end thereof, one of said knives being supported tangent to the front ends of the troughs, the other knife being in line with said slots, a gauging mechanism mounted on said frame above said conveyor, said gauging mechanism comprising two parallel shafts, two spaced sprocket wheels on each said shaft, each wheel on one shaft being aligned with a wheel on the other shaft, a chain running on each pair of aligned wheels, transverse bars attached at their ends to the respective chains, an arm hinged to each said bar near one end thereof and extending toward the other and, a foraminous presser member mounted on the free end of each arm, said gauging mechanism being located so that the lower reach thereof is spaced above the upper reach of the conveyor, the presser members in said lower reach fitting in successive troughs in the upper reach of the conveyor about five inches from the front end of the troughs, means for driving said conveyor and gauging mechanism in synchronism, means for depositing fish in the troughs of the upper reach and means for flowing a stream of water into the front end of troughs into which a presser member has entered.

References Cited by the Examiner

UNITED STATES PATENTS

| 1,125,656 | 1/15 | Cleveland | 17—4 |
| 2,799,043 | 7/57 | Walker | 17—4 |

SAMUEL KOREN, *Primary Examiner.*

LUCIE H. LAUDENSLAGER, *Examiner.*